United States Patent
Fujita et al.

(10) Patent No.: US 6,819,024 B1
(45) Date of Patent: Nov. 16, 2004

(54) IRON CORE OF ROTATING-ELECTRIC MACHINE AND MANUFACTURING METHOD FOR THE SAME

(75) Inventors: Masahiko Fujita, Tokyo (JP); Yoshihiro Harada, Tokyo (JP); Naohiro Oketani, Tokyo (JP); Katsumi Adachi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/688,867

(22) Filed: Oct. 17, 2000

(30) Foreign Application Priority Data

Apr. 14, 2000 (JP) ........................................ 2000-113583

(51) Int. Cl.⁷ .............................. H02K 1/06; H02K 1/12
(52) U.S. Cl. ...................................................... 310/216
(58) Field of Search ........................ 310/42, 216, 261, 310/264, 217, 259; 29/596–598

(56) References Cited

U.S. PATENT DOCUMENTS

| | | | | |
|---|---|---|---|---|
| 2,845,555 A | * | 7/1958 | Carpenter et al. | 310/216 |
| 2,908,965 A | * | 10/1959 | Platt | 310/216 |
| 3,842,493 A | * | 10/1974 | Ohuchi et al. | 29/596 |
| 3,886,256 A | | 5/1975 | Ohuchi et al. | |
| 4,102,040 A | | 7/1978 | Rich | |
| 4,365,180 A | * | 12/1982 | Licata et al. | 310/216 |
| 4,654,552 A | * | 3/1987 | Fritzsche | 310/216 |
| 4,912,833 A | * | 4/1990 | Fritzsche | 29/596 |
| 5,592,731 A | * | 1/1997 | Huang et al. | 29/596 |
| 5,831,366 A | | 11/1998 | Kern et al. | |
| 6,147,431 A | * | 11/2000 | Asao et al. | 310/254 |
| 6,265,804 B1 | * | 7/2001 | Nitta et al. | 310/217 |
| 6,317,962 B1 | * | 11/2001 | Adachi et al. | 310/216 |

FOREIGN PATENT DOCUMENTS

| | | | |
|---|---|---|---|
| DE | 1763506 | 11/1971 | |
| JP | 48-9201 | 2/1973 | |
| JP | 05-184105 | 7/1993 | |
| JP | 08-080014 | 3/1996 | |
| JP | 9-103052 | 4/1997 | .......... H02K/15/02 |
| JP | 10-234159 | 9/1998 | |
| JP | 11-18378 | 1/1999 | ............ H02K/1/16 |

* cited by examiner

*Primary Examiner*—Tran Nguyen
(74) *Attorney, Agent, or Firm*—Sughrue Mion, PLLC

(57) ABSTRACT

An iron core of a rotating-electric machine and a manufacturing method for the same permit a uniform curvature to be easily obtained over an entire circumference of the iron core. The iron core has laminated magnetic plate strips, a cylindrical core proximal portion, a plurality of teeth projecting in a substantially radial direction from the core proximal portion, and slots for accommodating a winding that are located between the teeth adjacent to each other. The iron core is fabricated by curving both end portions of a substantially hexahedral laminate so that the core proximal portion obtains a predetermined curvature, forming the entire laminate into a cylindrical shape by wrapping it around a cylindrical core member so that distal ends of the teeth project from the core proximal portion, and joining both end portions of the laminate.

6 Claims, 19 Drawing Sheets

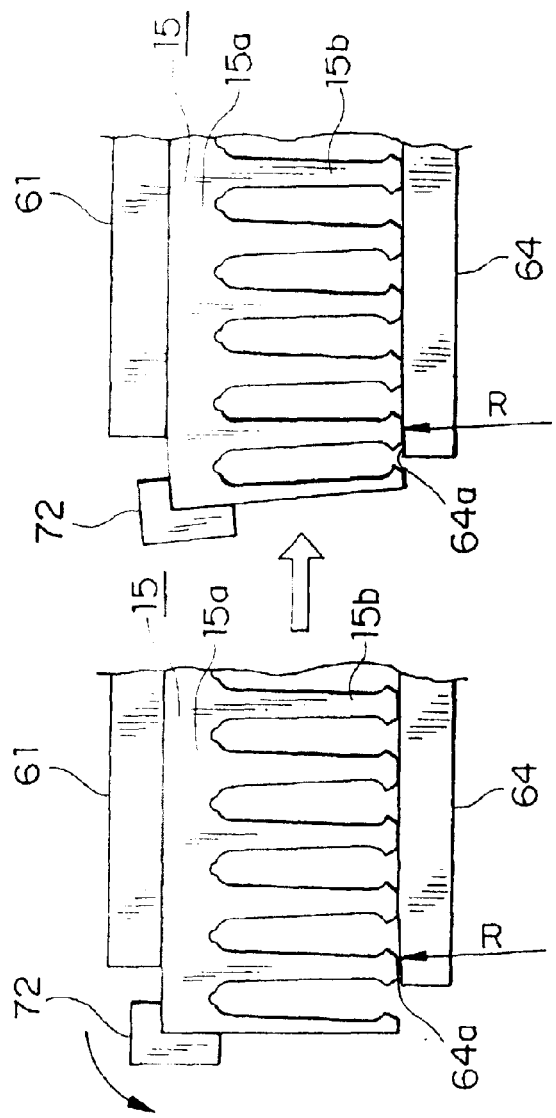

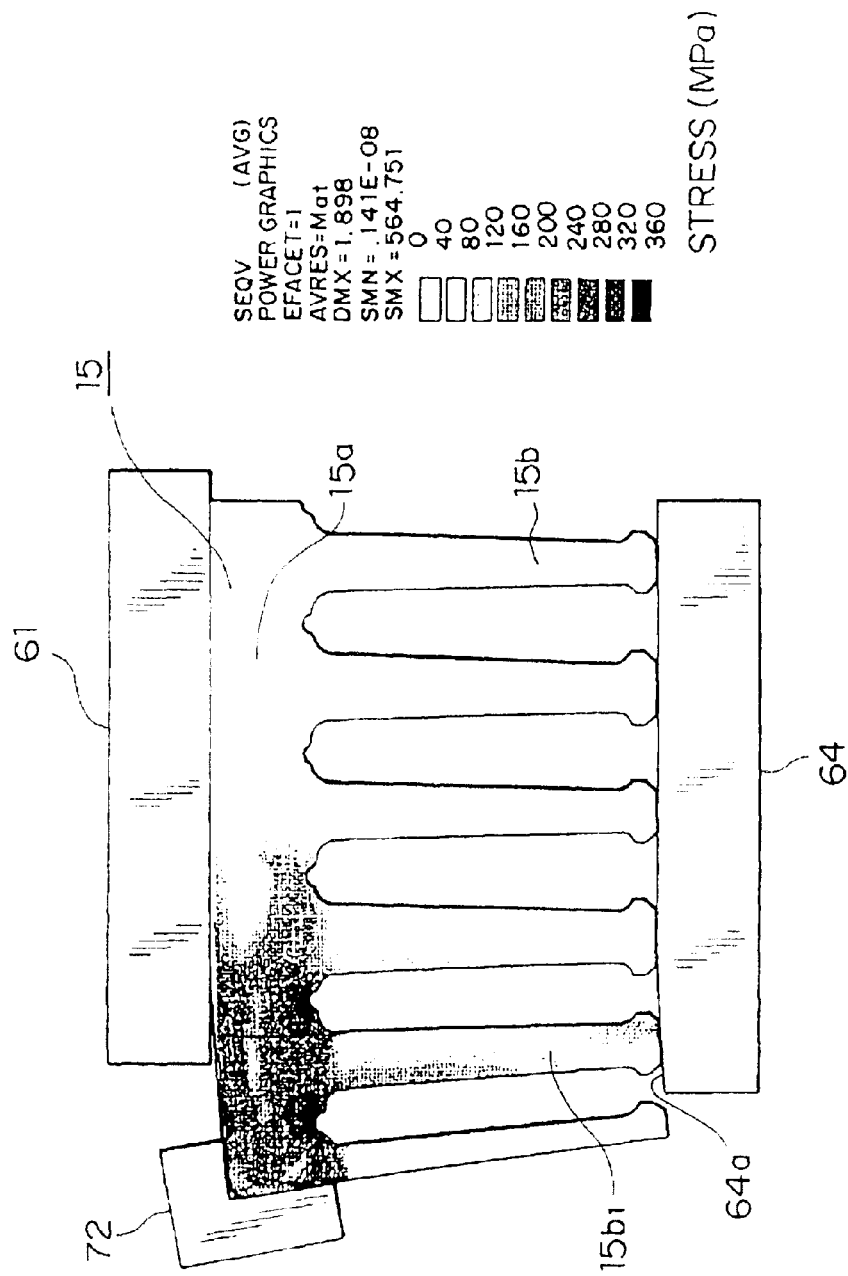

FIG. 15A
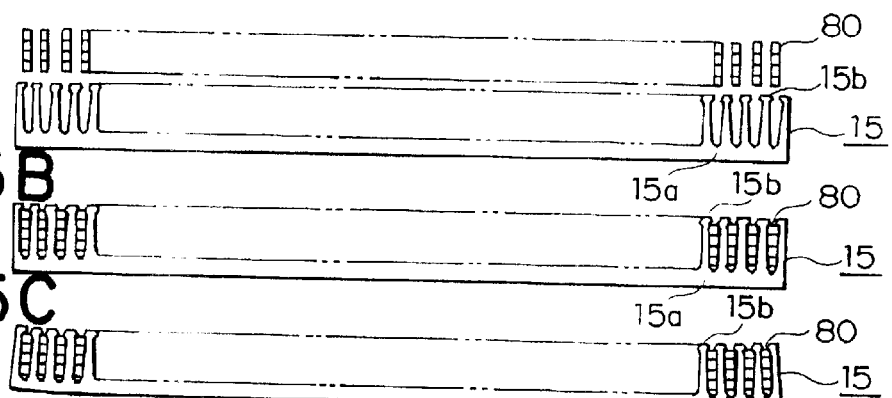
FIG. 15B
FIG. 15C
FIG. 15D
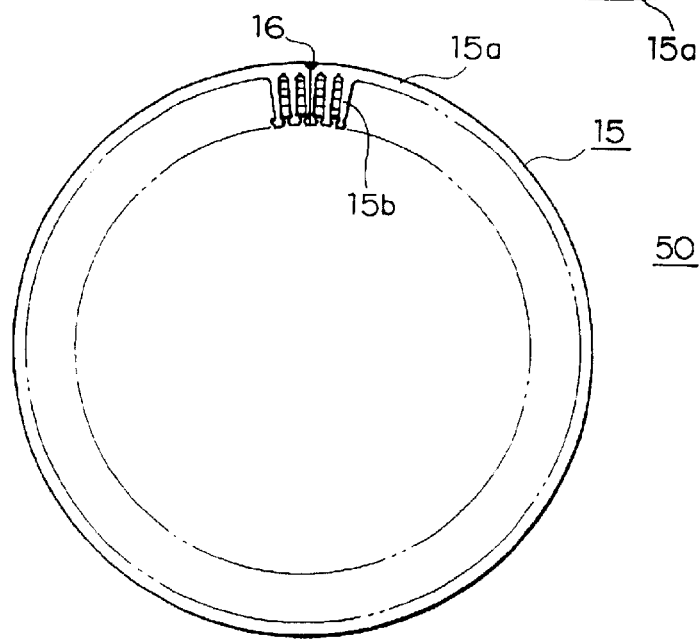

IRON CORE OF ROTATING-ELECTRIC MACHINE AND MANUFACTURING METHOD FOR THE SAME

BACKGROUND OF THE INVENTION

1. Field of the Invention

The present invention relates to an iron core of a rotating-electric machine and, more particularly, to an iron core of a rotating-electric machine composed of laminated steel plates, and a manufacturing method for the same.

2. Description of the Related Art

FIG. 21 is a perspective view of a laminate used for an iron core of a conventional rotating-electric machine disclosed in, for example, Japanese Unexamined Patent Application Publication No. 48-9201. FIG. 22 shows a laminate of the iron core being formed by wrapping it around a cylindrical core member. FIG. 23 shows the formed iron core with its both end portions joined. A laminate 5 is fabricated by laminating a predetermined number of straight magnetic strips which are blanked out, and has a core proximal portion 5a and a plurality of teeth 5b equidistantly arranged. The laminate 5 that has been formed into a substantially hexahedral shape is wound with a winding (not shown), wrapped around a cylindrical core member 9 into a cylindrical shape, and an abutting portion 10 where both end portions thereof are abutted against each other is welded to join the end portions.

In the conventional iron core of a rotating-electric machine described above, as set forth above, a plurality of slots for accommodating the winding are formed in the magnetic strips, and the magnetic strips with the slots are stacked to form the substantially hexahedral laminate 5. The laminate 5 is wound around the cylindrical core member 9 to be shaped into a cylinder, and both end portions thereof are joined.

Such a conventional iron core 40 of a rotating-electric machine is not a cylindrical iron core from the start. Winding work can be facilitated by wrapping a winding (not shown) around the substantially hexahedral laminate 5. There is an advantage in that, since the laminated 5 is curved after installing the winding, a sectional area of a slot after curving becomes smaller than that before curving, thus allowing the winding to be disposed at a higher density.

On the other hand, in the case of the conventional iron core 40 of the rotating-electric machine having the construction described above, portions in the vicinity of both end portions are formed to have larger-radius curves than a curve of the remainder thereof, so that joining surfaces of the abutting end portions do not snugly meet, leading to unsuccessful joining when the virtually hexahedral laminate 5 is wrapped around the cylindrical core member into a cylindrical shape. More specifically, the curves near the abutting portion 10 are insufficient, and a curvature radius is uneven over an entire circumference, presenting a problem in that joining surfaces are misaligned, resulting in unsuccessful joining.

There has been another problem in that forcibly meeting the abutting portion 10 deteriorates the roundness of the iron core.

Furthermore, in the conventional iron core 40 of a rotating-electric machine having the above construction, there has been still another problem in that wavy deformation as shown in FIG. 24 occurs when the iron core 40 is cylindrically wound around the cylindrical core member 9.

There has been yet another problem in that bending rigidity at both end portions of the virtually hexahedral laminate 5 is high, and a large force is required for curving the end portions, causing a tooth portion 5b to buckle.

SUMMARY OF THE INVENTION

Accordingly, the present invention has been made with a view toward solving the problems described above, and it is an object thereof to provide an iron core of a rotating-electric machine capable of allowing a curvature of the iron core to be easily made uniform over its entire circumference, permitting roundness of the cylindrical iron core to be improved, preventing the occurrence of wavy deformation and also preventing a tooth portion from buckling or deforming, allowing a reduced space between a magnetic pole or a magnet opposing the iron core to be achieved, allowing lower magnetic resistance of an air gap, and permitting an output of the rotating-electric machine to be increased. Another object of the present invention is to provide a manufacturing method for the iron core of the rotating-electric machine described above.

To this end, according to one aspect of the present invention, there is provided an iron core of a rotating-electric machine, which iron core is constructed by laminated magnetic plate strips; a cylindrical core proximal portion; a plurality of teeth projecting in a substantially radial direction from the core proximal portion; and slots for accommodating a winding that are located between the teeth adjacent to each other, wherein the iron core is fabricated by curving both end portions of a substantially hexahedral laminate so that the core proximal portion obtains a predetermined curvature, forming the entire laminate into a cylindrical shape by wrapping it around a cylindrical core member so that distal ends of the teeth project from the core proximal portion, and joining both end portions of the laminate.

In a preferred form, both end portions of the core proximal portion of a laminate have a lower rigidity than that of the remainder thereof.

In another preferred form, both end portions of the core proximal portion of the laminate are provided with thinner portions that are thinner in a radial direction so as to have a lower rigidity.

In yet another preferred form, a filling member for making a diameter of a circumferential end portion of the core proximal portion identical to that of the remainder is welded to the thinner portions.

In still another preferred from, both end portions of the core proximal portion of the laminate are formed so that the diameter of the circumferential end portion of the core proximal portion becomes smaller toward and end thereof so as to reduce the rigidity thereof.

In a further preferred form, both end portions of the core proximal portion of the laminate are provided with at least one notch each at a location adjacent to the circumferential end portion of the core proximal portion so as to reduce the rigidity thereof.

In a further preferred form, the iron core of the rotating-electric machine is formed by curving a single virtually hexahedral laminate.

According to another aspect of the present invention, there is provided a manufacturing method for an iron core of a rotating-electric machine, the iron core including laminated magnetic plate strips, a cylindrical core proximal portion, a plurality of teeth projecting in a substantially radial direction from the proximal core portion, and slots for accommodating a winding that are located between adjoining teeth, the manufacturing method including: an end portion curving step for curving both end portions of a substantially hexahedral laminate of the iron core so that the core proximal portion obtains a predetermined curvature; a body curving step for curving the entire laminate into a cylindrical shape by wrapping it around a cylindrical core member so that distal ends of the teeth project from the core proximal portion; and a joining step for joining both end portions of the laminate.

In a preferred form, the laminate is clamped between a first fixing jig disposed at the core proximal portion and a second fixing jig disposed at the teeth such that the end portions project by a predetermined length, and the end portions of the laminate are curved by pressing the end portions in a direction in which the teeth project by a pressing jig in the end portion curving step, an end portion of the second fixing jig that is adjacent to the teeth being provided with an arc or linear slope that becomes farther from the teeth toward an end thereof.

In another preferred form, the laminate is clamped between a first fixing jig disposed at the core proximal portion and a second fixing jig disposed at the teeth such that the end portions project by a predetermined length, and a closely contacting jig having an L-shaped section is placed in close contact with a corner of the core proximal portion of the end of the laminate, and the end portions of the laminate are curved using the closely contacting jig such that they are wrapped toward the teeth, an end portion of the second fixing jig that is adjacent to the teeth being provided with an arc or linear slope that becomes farther from the teeth toward an end thereof.

In a further preferred form, the iron core is formed by curving a single laminate having a substantially hexahedral shape, and the body curving step includes: a first body curving step in which a central portion of the laminate is clamped, and both end portions of a predetermined length from ends are wrapped around a cylindrical core member; and a second body curving step in which the curved portions that have been formed in the first step are clamped and the remaining central portion is curved by wrapping it around the core member.

According to still another aspect of the present invention, there is provided a manufacturing method for an iron core of a rotating-electric machine constructed by laminated magnetic plate strips, a cylindrical core proximal portion, a plurality of teeth projecting in a substantially radial direction from the core proximal portion, and slots for accommodating a winding that are formed between the teeth adjacent to each other, the manufacturing method including: a body curving step for wrapping a central portion of a laminate around a cylindrical core member to form the laminate into a cylindrical shape such that distal ends of teeth project from the core proximal portion; an end portion curving step for clamping the laminate, which has been curved in the body curving step, at inner and outer peripheries except end portions thereof and curving the end portions of the laminate by pressing or wrapping the end portions toward the inner periphery thereof; and a joining step for joining both end portions of the laminate.

In a preferred form, the manufacturing method includes a step for accommodating a winding in slots of the substantially hexahedral laminate before at least the body curving step, and the body curving step is implemented with the winding accommodated in the slots.

In a further preferred form, the body curving step is carried out while at least a part of the core proximal portion of the laminate is slidably guided from both sides.

BRIEF DESCRIPTION OF THE DRAWINGS

FIG. 1 illustrates a manufacturing process of an iron core of a rotating-electric machine in accordance with the present invention, wherein

FIG. 3 presents side views of an essential section showing yet another embodiment of the iron core of the rotating-electric machine in accordance with the present invention, wherein

FIG. 11 is a process diagram showing an end of a laminate being curved according to yet another embodiment of the manufacturing method for an iron core of a rotating-electric machine in accordance with the present invention.

FIG. 12 is a diagram showing a distribution of internal stress generated when the end portion is curved by the method illustrated in FIG. 11.

FIG. 15 is a process diagram showing a procedure for curving a laminate according to a further embodiment of the manufacturing method of the iron core of a rotating-electric machine in accordance with the present invention.

FIG. 18 illustrates a manufacturing process of another embodiment of an iron core of a rotating-electric machine in accordance with the present invention, wherein

DESCRIPTION OF THE PREFERRED EMBODIMENTS

First Embodiment

Figure 1A:
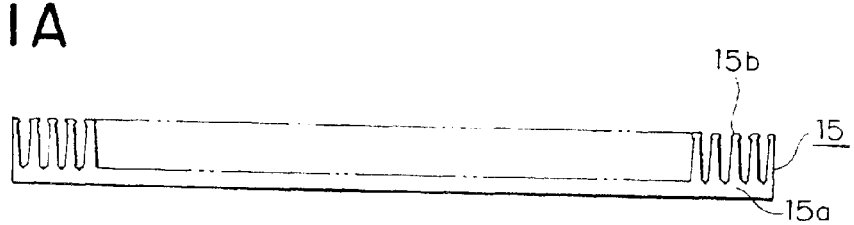
FIG. 1A is a side view of a substantially hexahedral laminate.
Figure 1B:
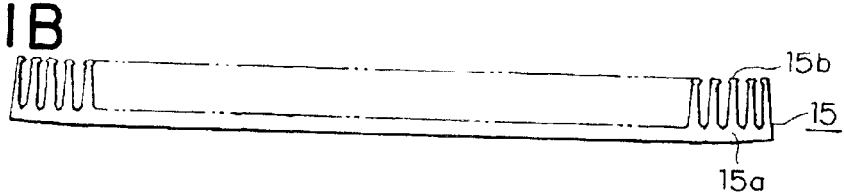
FIG. 1B is a side view of the laminate with its both end portions curved.
Figure 1C:
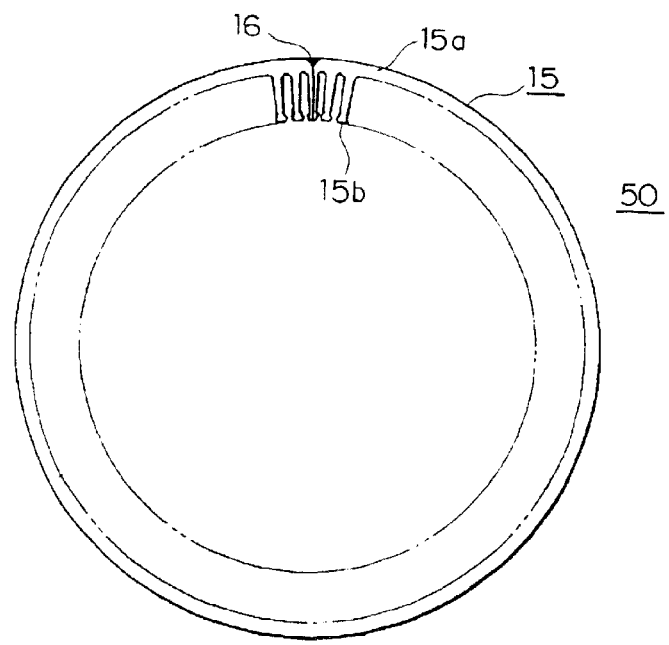
FIG. 1C is a side view of the laminate with its both end portions joined to form a cylindrical iron core.

FIG. 1 is a diagram showing a manufacturing process of an iron core of a rotating-electric machine in accordance with the present invention. FIG. 1A is a side view of a substantially hexahedral laminate, FIG. 1B is a side view of the laminate with its both end portions curved, and FIG. 1C is a side view of the laminate with its both end portions joined to form a cylindrical iron core.

To fabricate a laminate 15, first, a plurality of linear magnetic strips, each having a core proximal portion 15a and a plurality of teeth 15b, are prepared by blanking out as in the case of the prior art, and the magnetic strips are laminated to fabricate the substantially hexahedral laminate 15 as shown in FIG. 1A.

Then, both end portions of the virtually hexahedral laminate 15 are curved at a predetermined curvature so that distal ends of the teeth 15b are oriented toward a center as shown in FIG. 1B (an end portion curving step). The predetermined curvature in this case is approximate to a curvature of a finished cylindrical iron core 50 or an iron core after curving the body of the laminate.

Lastly, as illustrated in FIG. 1C, the entire laminate 15 is cylindrically formed by wrapping it around a cylindrical core member (not shown) such that the distal ends of the teeth 15b are oriented to an inner periphery (a body curving step), and a joining portion 16 where both end portions of the laminate 15 abut against each other is welded by laser welding or electron beam welding (a joining step).

Lastly, the laminate 15 is formed into an iron core 50 that has the cylindrical core proximal portion 15a and the plural teeth 15b jutting out toward an axial center from the core proximal portion 15a, and is provided with slots for accommodating a winding, the slots being located between adjacent teeth.

In the iron core 50 of a rotating-electric machine constructed as described above, the end portions of the virtually hexahedral laminate 15 are curved in the end portion curving step, then the laminate 15 is formed into a cylindrical shape by wrapping the laminate 15 around a cylindrical core member in the body curving step. This arrangement permits an iron core to have uniform curvature over its entire circumference with consequent improved roundness of the cylindrical iron core 50. The improved roundness of the iron core 50 makes it possible to reduce a gap relative to a magnetic member disposed, facing against the iron core 50, permitting magnetic resistance in the gap to be reduced. Hence, an output of the rotating-electric machine can be improved.

Second Embodiment

Figure 2:
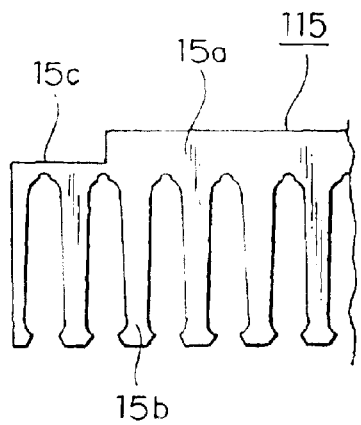
FIG. 2 is a side view of an essential section showing another embodiment of the iron core of a rotating-electric machine in accordance with the present invention.

FIG. 2 is a side view of an essential section illustrating another embodiment of the iron core of the rotating-electric machine in accordance with the present invention.

In a laminate 115 in this embodiment, portions on the outer periphery side of both end portions of the core proximal portion 15a are cut off, and a thinner portion 15c having a smaller thickness to reduce an outside diameter of the core proximal portion 15a is provided. This reduces the rigidity of both end portions. FIG. 2 shows only one end, whereas the thinner portion 15c is provided on both end portions of the laminate 115. The rest of the construction of this embodiment is identical to the construction of the first embodiment.

In the iron core of the rotating-electric machine configured as set forth above, the thinner portions 15c provided on both end portions of the substantially hexahedral laminate 115 permit the end portions to be curved more easily, and a force required for curving the end portions is reduced, making it possible to lessen possibilities of the occurrence of buckle or deformation of the teeth 15b.

Third Embodiment

Figure 3A:
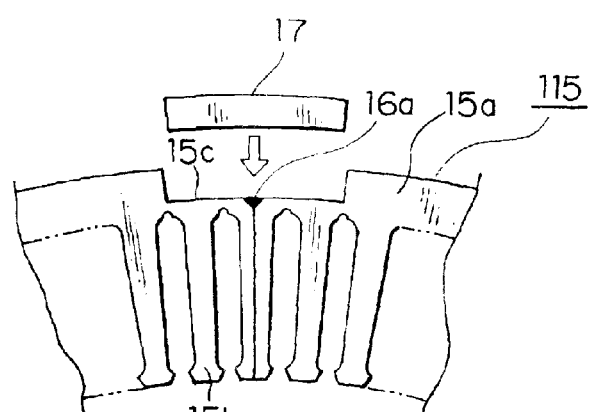
FIG. 3A is a side view showing a recessed section in the vicinity of a junction, the recessed section being in the process of filling.
Figure 3B:
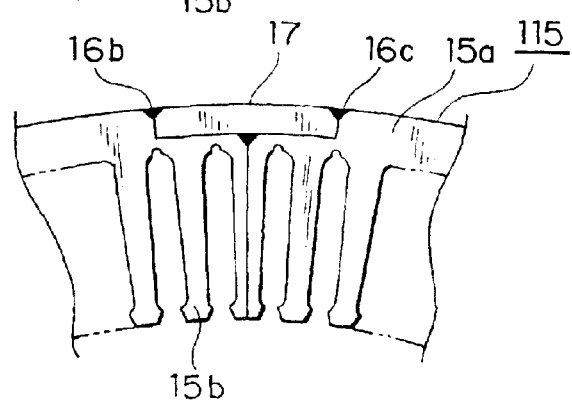
FIG. 3B is a side view showing the recessed section in the vicinity of the junction, the recessed section having been filled.

FIG. 3 presents side views of an essential section showing yet another embodiment of the iron core of the rotating-electric machine in accordance with the present invention. FIG. 3A is a side view showing a recessed section in the vicinity of a junction, the recessed section being in the process of filling, and FIG. 3B is a side view showing the recessed section in the vicinity of the junction, the recessed section having been filled.

In the laminate 115 of the second embodiment described above, the portions on the outer periphery side of both end portions of a core proximal portion 15a are cut off, and the thinner portions 15c having a smaller thickness to reduce the outside diameter of the proximal portion 15a are provided on the end portions so as to lessen the rigidity of the end portions.

In an iron core 50 fabricated as described above, both end portions of the laminate 115 are joined in a joining step, then the recessed sections are formed in the vicinity of the junction on the outer periphery side. In general, when the proximal portion 15a of the iron core has a portion having a smaller radial width, magnetic saturation occurs due to the portion, resulting in a lower output of the rotating-electric machine.

In the third embodiment, to solve the problem mentioned above, a filling piece 17 for filling the thinner portions 15c forming the recessed section is welded so as to make the outside diameter of the thinner portions 15c identical to the remainder. The filling piece has a configuration that snugly fits in the recessed section, and is welded at both end portions (junctions 16b and 16c) by laser welding or electron beam welding.

The rest of the construction of the third embodiment is the same as the construction of the second embodiment.

In the iron core 50 of the rotating-electric machine configured as set forth above, the core proximal portion 15a has no portion of a smaller radial width, so that likelihood of the occurrence of magnetic saturation is reduced, leading to higher output of the rotating-electric machine. Furthermore, welding the filling piece 17 improves the strength of the iron core.

Fourth Embodiment

Figure 4:
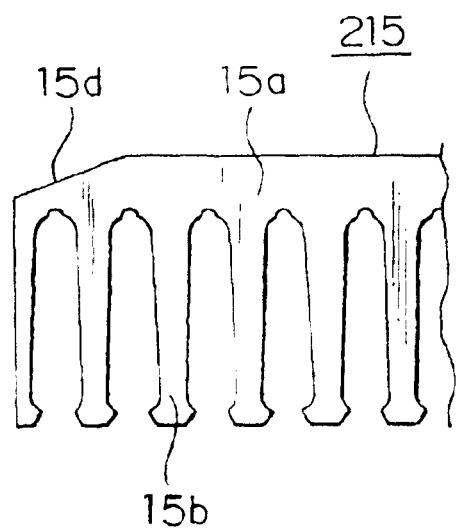
FIG. 4 is a side view showing an essential section of a further embodiment of the iron core of the rotating-electric machine in accordance with the present invention.

FIG. 4 is a side view showing an essential section of a further embodiment of the iron core of the rotating-electric machine in accordance with the present invention.

In a laminate 215 of this embodiment, slope portions 15d are formed on both end portions of a core proximal portion 15a so that an outside diameter of the proximal portion grows smaller toward the end portions, thus reducing the rigidity thereof.

The rest of the construction of the fourth embodiment is the same as that of the first embodiment.

In an iron core 50 of the rotating-electric machine configured as set forth above, both end portions of the substantially hexahedral laminate 215 permits both end portions to be curved easily, and a force required for curving both end portions is reduced, making it possible to lessen possibilities of the occurrence of buckle or deformation of teeth 15b. Moreover, the simple configuration permits easy machining of the end portions.

Fifth Embodiment

Figure 5:
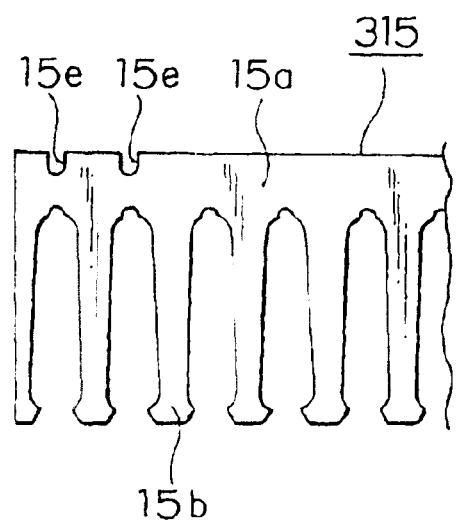
FIG. 5 is a side view showing an essential section of a still another embodiment of the iron core of the rotating-electric machine in accordance with the present invention.

FIG. 5 is a side view showing an essential section of a still another embodiment of the iron core of the rotating-electric machine in accordance with the present invention.

In a laminate 315 of this embodiment, both end portions of a core proximal portion 15a are provided with notches 15e, whose sections are shaped like narrow slots, at the outer periphery side thereof so as to reduce the rigidity.

The rest of the configuration is the same as the configuration of the first embodiment.

In an iron core 50 of the rotating-electric machine configured as described above, both end portions of the substantially hexahedral laminate 315 can be curved easily, and a force required for curving both end portions is reduced, making it possible to lessen possibilities of the occurrence of buckle or deformation of teeth 15b. Moreover, the simple configuration permits easy machining of the end portions.

Sixth Embodiment

Figure 6:
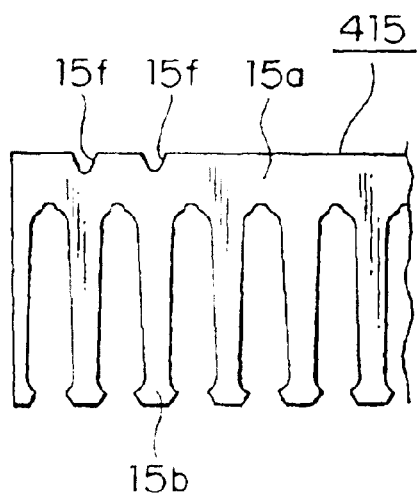
FIG. 6 is a side view showing an essential section of yet another embodiment of the iron core of the rotating-electric machine in accordance with the present invention.

FIG. 6 is a side view showing an essential section of a further embodiment of the iron core of the rotating-electric machine in accordance with the present invention.

In a laminate 415 of this embodiment, both end portions of a core proximal portion 15a are provided with notches 15f, whose sections are triangular, at the outer periphery side thereof so as to reduce the rigidity.

The rest of the configuration is the same as the configuration of the first embodiment.

In an iron core 50 of the rotating-electric machine configured as described above, both end portions of the substantially hexahedral laminate 415 can be curved easily, and a force required for curving both end portions is reduced, making it possible to lessen possibilities of the occurrence of buckle or deformation of teeth 15b. Moreover, the simple configuration permits easy machining of the end portions.

Seventh Embodiment

Figure 7:
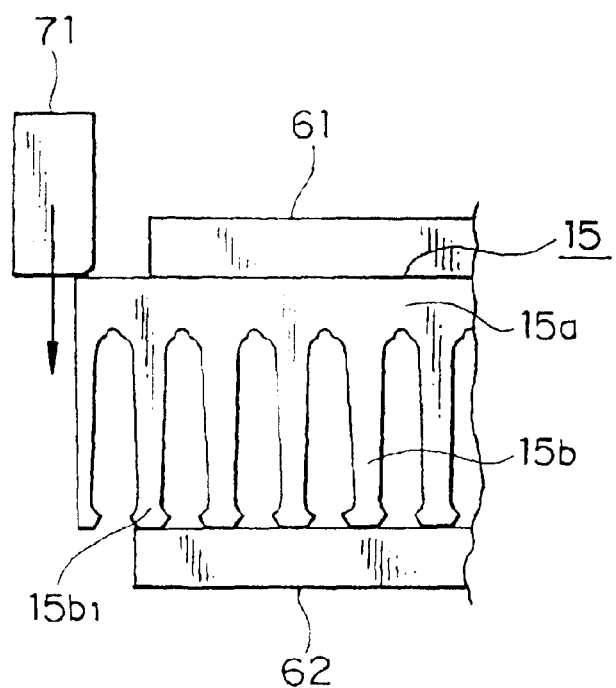
FIG. 7 is a side view showing a state wherein an end of the substantially hexahedral laminate is being curved in an end portion curving step.
Figure 8:
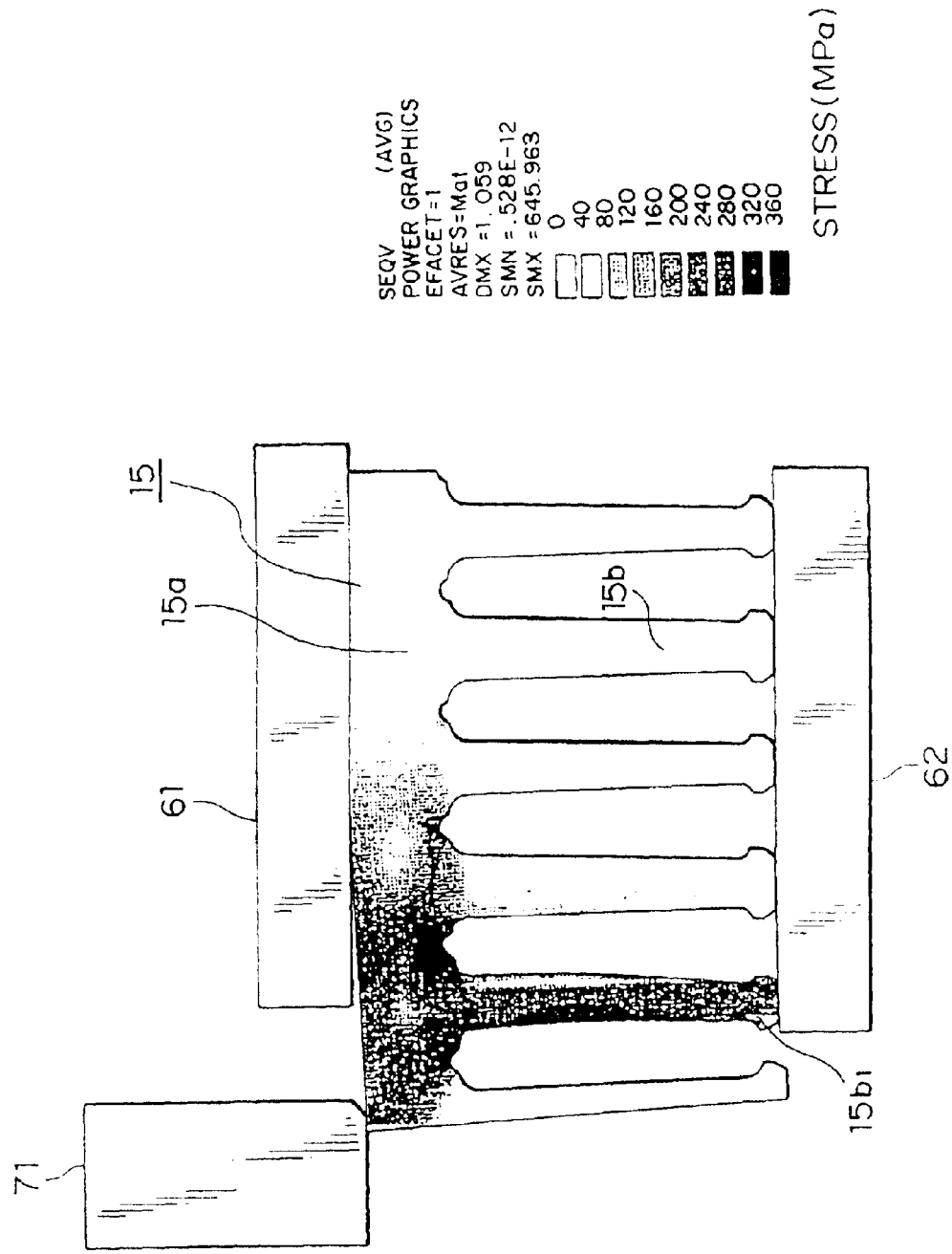
FIG. 8 is a diagram showing a distribution of internal stress generated when the end portion is curved by the method illustrated in FIG. 7.

FIG. 7 is a side view showing a state wherein an end of the substantially hexahedral laminate is being curved. FIG. 8 is a diagram showing a distribution of internal stress generated when the end portion is curved by the method illustrated in FIG. 7. In FIG. 8, a darker shade denotes an area to which a higher stress is applied.

In a method for curving the two end portions of a substantially hexahedral laminate 15 shown in FIG. 7, the laminate 15 is clamped by a first fixing jig 61 disposed on a core proximal portion 15a and a second fixing jig 62 disposed on teeth 15b so that end portions jut out by a predetermined length. A pressing jig 71 is abutted against the end of the core proximal portion 15a of the laminate 15, and the laminate 15 is pressed vertically or in the direction in which the teeth 15b project.

This method has been posing a problem in that a high stress is applied to a second tooth 15b1 from the end to be curved as shown in FIG. 8, causing the second tooth 15b1 to buckle.

Figure 9:
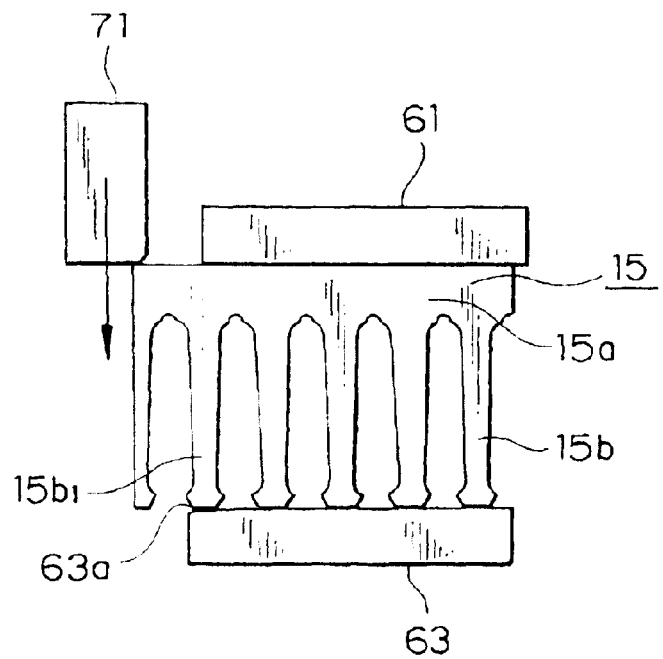
FIG. 9 is a side view showing an end of a laminate being curved according to a manufacturing method for an iron core of a rotating-electric machine in accordance with the present invention.

FIG. 9 is a side view showing a step for curving the end of the laminate according to the manufacturing method for an iron core of a rotating-electric machine in accordance with the present invention. According to the manufacturing method for an iron core of this embodiment, the end of the second fixing jig 63 adjacent to the teeth 15b is provided with a linear slope 63a formed to be distanced farther from the teeth 15b toward the end in the vicinity of a location where the second tooth 15b1 from the end abuts the jig. This arrangement protects the second tooth 15b1 from the end to be curved from an excessive stress, thus preventing the second tooth 15b1 from buckling.

In the manufacturing method for an iron core of a rotating-electric machine described above, both end portions of the laminate are curved to have a final curvature according to the above method before the entire laminate is formed into a cylindrical shape by wrapping it around a cylindrical core member. This makes it possible to easily provide the iron core with a uniform curvature over the entire circumference thereof, resulting in improved roundness of a cylindrical iron core 50. The improved roundness of the iron core 50 allows a reduced gap relative to a rotator opposing the iron core, and a magnetic resistance in the gap can be reduced. Hence, a higher output of the rotating-electric machine can be accomplished.

Moreover, the end portions can be curved simply by pressing them in the direction in which the teeth 15b project, permitting the machining procedure to be simplified. In addition, the slope 63a makes it possible to set the angle at which the teeth 15b abut the second fixing member 63 at an appropriate angle, lessening the possibility of buckle or deformation of the teeth 15b, which interfere with curving.

Eighth Embodiment

Figure 10:
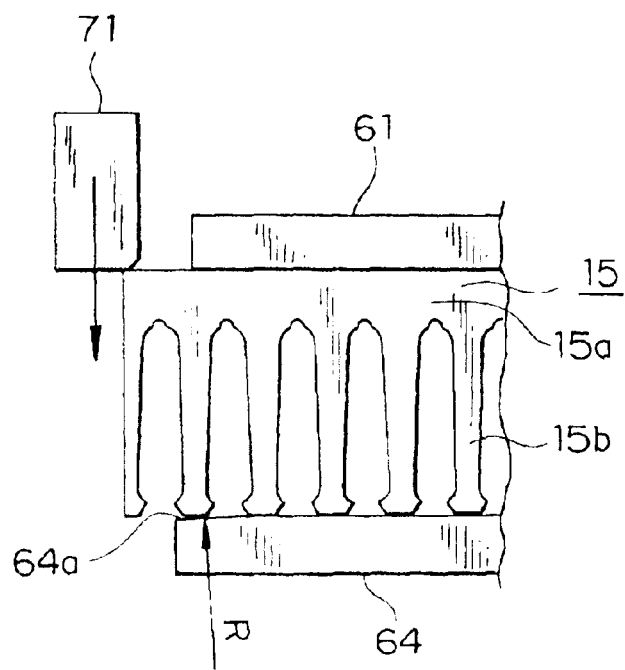
FIG. 10 is a side view showing an end of a laminate being curved according to another embodiment of the manufacturing method for an iron core of a rotating-electric machine in accordance with the present invention.

FIG. 10 is a side view showing an end of a laminate being curved according to another embodiment of the manufacturing method for an iron core of a rotating-electric machine in accordance with the present invention.

In the manufacturing method for the iron core of this embodiment, the end of a second fixing jig 64 adjacent to the teeth 15b is provided with an arc slope 64a formed to be distanced farther from the teeth 15b toward the end in the vicinity of a location where the second tooth 15b1 from the end abuts the jig.

The rest of the configuration of this embodiment is the same as the configuration of the seventh embodiment.

In the manufacturing method for the iron core of the rotating-electric machine described above, the arc slope 64a makes it possible to set the angle at which the teeth 15b abut the second fixing member 64 to a further appropriate angle, thus further lessening the possibility of buckle or deformation of the teeth 15b, which interfere with curving.

Ninth Embodiment

FIG. 11 is a process diagram showing an end of a laminate being curved according to yet another embodiment of the manufacturing method for an iron core of a rotating-electric machine in accordance with the present invention. FIG. 12 is a diagram showing a distribution of internal stress generated when the end portion is curved by the method illustrated in FIG. 11. In FIG. 12, a darker shade denotes an area to which a higher stress is applied.

In this embodiment, as in the case of the eighth embodiment, the end of a second fixing jig 64 adjacent to the teeth 15b is provided with an arc slope 64a formed to be distanced farther from the teeth 15b toward the end in the vicinity of a location where the second tooth 15b1 from the end abuts the jig.

Further, in this embodiment, a closely contacting jig 72 having an L-shaped section is brought into close contact with a corner of the end of the core proximal portion 15a of the laminate 15 as shown in FIG. 11A, and the end portion of the laminate 15 is curved to wrap toward teeth 15b as shown in FIG. 11B by using the closely contacting jig 72.

In this embodiment, the slope 64a combined with the curving method using the closely contacting jig 72 for wrapping-like curving hardly apply a stress to the second tooth 15b1 as can be seen from FIG. 12.

In the manufacturing method for the iron core of the rotating-electric machine described above, the arc slope 64a makes it possible to set the angle at which the teeth 15b abut the second fixing member 64 to an appropriate angle, thus further lessening the possibility of buckle of the teeth 15b. Moreover, since the end portion is curved to wrap using the closely contacting jig 72, a curving moment can be applied to the portion of the laminate 15 to be curved while reducing the stress applied to the teeth 15b at a position away from the end by a predetermined distance. This makes it possible to further lessen the possibility of buckle of the teeth 15b.

Tenth Embodiment

FIG. 13 is a process diagram showing a procedure for curving a laminate according to still another embodiment of the manufacturing method of the iron core of a rotating-electric machine in accordance with the present invention.

Figure 13A:
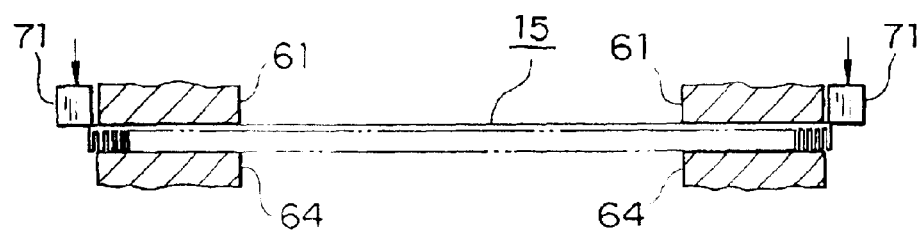
FIG. 13 is a process diagram showing a procedure for curving a laminate according to still another embodiment of the manufacturing method of the iron core of a rotating-electric machine in accordance with the present invention.

In this embodiment, as shown in FIG. 13A, both end portions of a laminate 15 are curved at a predetermined curvature so that distal ends of the teeth 15b are oriented toward a center according to the method of the eighth embodiment (an end portion curving step).

Figure 13B:
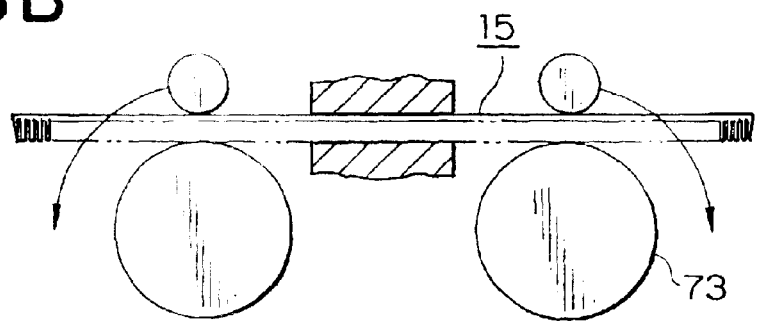

Then, as illustrated in FIG. 13B, a central portion of the laminate 15 is clamped, and both end portions, each having a quarter length from the end, are curved by being wrapped around cylindrical core members 73 (a first body curving step).

Figure 13C:
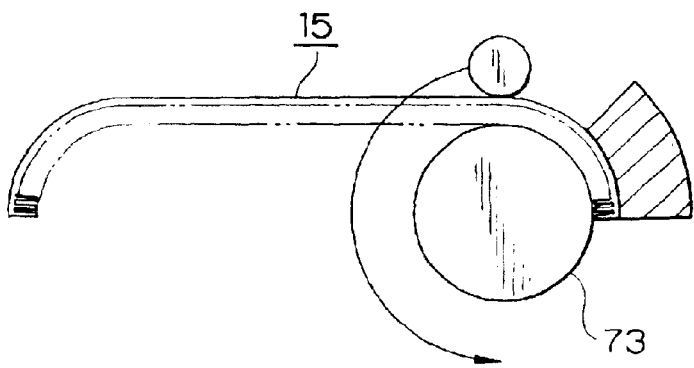

Next, as illustrated in FIG. 13C, one of the portions that have been curved by the quarter length in the first body curving step is held, and the remaining un-curved central portion is curved by being wrapped around the core member 73 (a second body curving step).

Figure 13D:
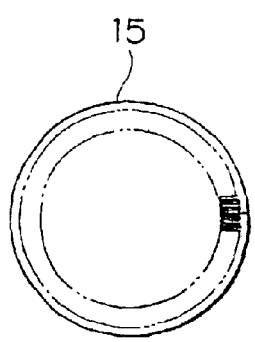

Lastly, as shown in FIG. 13D, both end portions of the laminate abutting each other are joined by laser welding or electron beam welding (a joining step).

According to the manufacturing method for the iron core of the rotating-electric machine described above, a wide area of the central portion is clamped, so that the end portions can be easily wound onto the core members.

Eleventh Embodiment

FIG. 14 is a process diagram showing a procedure for curving a laminate according to a further embodiment of the manufacturing method of the iron core of a rotating-electric machine in accordance with the present invention.

In this embodiment, end portions of a laminate 15 are not curved in a first step. According to the embodiment, the entire laminate 15 is curved according to the procedure illustrated in FIG. 13B and FIG. 13C of the tenth embodiment (a body curving step).

Figure 14A:
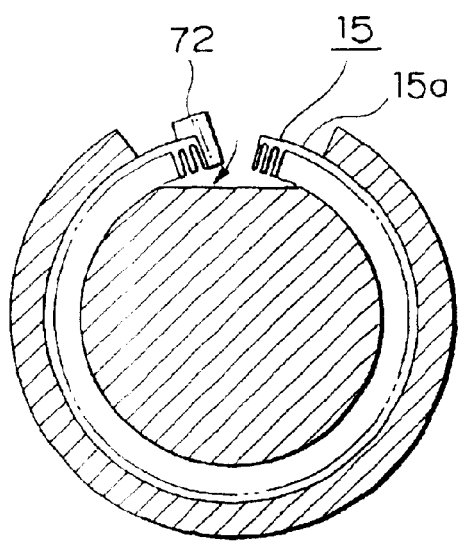
FIG. 14 is a process diagram showing a procedure for curving a laminate according to a further embodiment of the manufacturing method of the iron core of a rotating-electric machine in accordance with the present invention.

Then, as shown in FIG. 14A, the laminate 15, which has been curved in the foregoing body curving step, is clamped at its entire inner and outer peripheries except for its end portions. A closely contacting jig 72 having an L-shaped section is brought into close contact with a corner of an end of a core proximal portion 15a of the laminate 15, and the end portion of the laminate 15 is curved to wrap toward teeth 15b by using the closely contacting jig 72 (an end portion curving step).

Figure 14B:
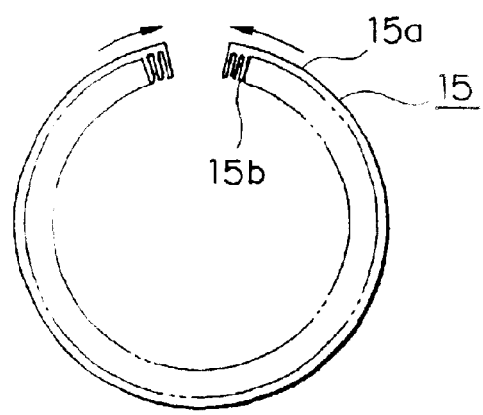
Figure 14C:
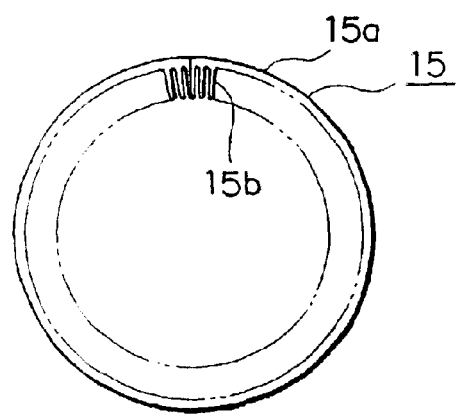

Thereafter, as illustrated in FIG. 14B and FIG. 14C, both end portions of the laminate are abutted each other and joined by laser welding or electron beam welding (a joining step).

The manufacturing method for an iron core of a rotating-electric machine described above makes it possible to easily provide the iron core with a uniform curvature over the entire circumference thereof, resulting in improved roundness of the cylindrical iron core. The improved roundness of the iron core allows a reduced gap relative to a rotator opposing the iron core, and a magnetic resistance in the gap can be reduced, so that a higher output of a rotating-electric machine can be achieved. Furthermore, the laminate is held at inner and outer peripheries thereof other than the end portions when curving the end portions, thus ensuring firm support. Hence, the occurrence of buckle of teeth 15b can be further reduced.

Twelfth Embodiment

Figure 16A:
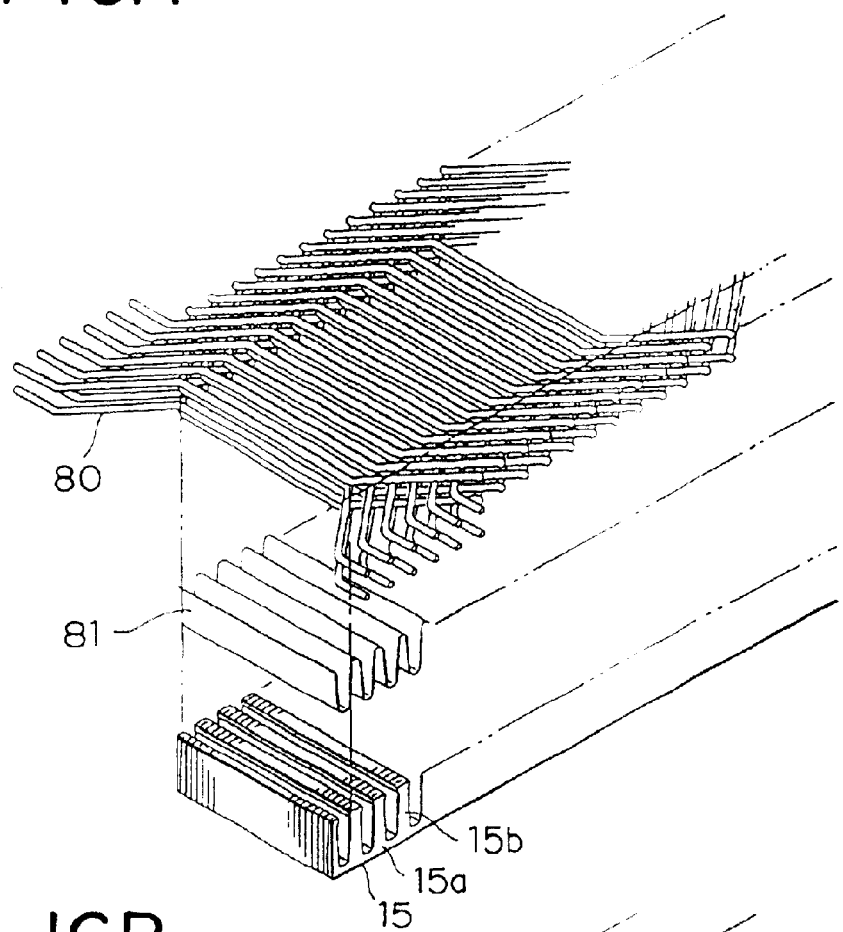
FIG. 16 is a diagram showing further details of the step for accommodating a winding shown in FIG. 15A.
Figure 16B:
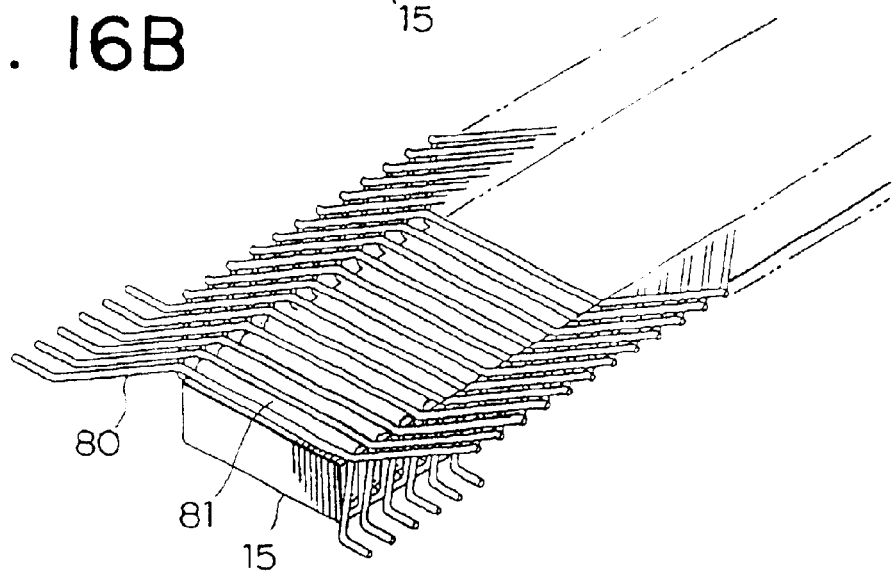

FIG. 15 is a process diagram showing a procedure for curving a laminate according to a further embodiment of the manufacturing method of the iron core of a rotating-electric machine in accordance with the present invention. FIG. 16 is a diagram showing further details of a step for accommodating a winding shown in FIG. 15A.

This embodiment has a step for accommodating a winding 80 in slots of a substantially hexahedral laminate 15 (a winding accommodating step) as shown in FIG. 15A prior to the body curving step of the first embodiment. In the winding accommodating step, the winding 80 and an insulator 81, which is interposed between the winding 80 and the laminate 15, are accommodated in the slots as shown in FIG. 16.

Thereafter, in the same manner as that of the first embodiment, the body curving step and the joining step are implemented except that these two steps are carried out with the winding 80 accommodated in the slots.

The manufacturing method for an iron core of a rotating-electric machine described above makes it possible to easily provide the iron core with a uniform curvature over the entire circumference thereof, resulting in improved roundness of the cylindrical iron core. The improved roundness of the iron core allows a reduced gap relative to a rotator opposing the iron core, and a magnetic resistance in the gap can be reduced, so that an output of a rotating-electric machine can be increased. Furthermore, the winding 80 is accommodated in the substantially hexahedral laminate 15, permitting an easy accommodating operation. In addition, sectional areas of the slots decrease after curving. Therefore, an occupancy of the winding in the slots can be increased, and the output of the rotating-electric machine can be improved.

The aforesaid winding accommodating step can be carried out before the body curving step in any one of the methods according to the first to eleventh embodiments. Subsequent steps can be carried out with the winding 80 accommodated in the slots.

Thirteenth Embodiment

Figure 17:
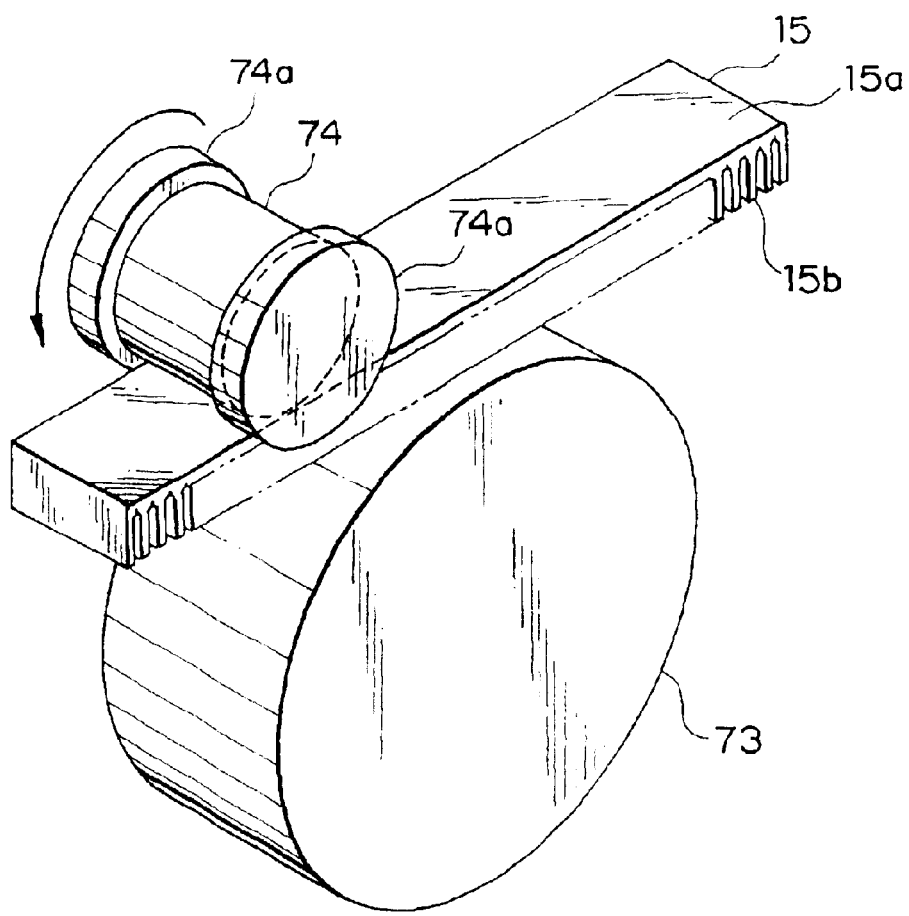
FIG. 17 is a perspective view illustrating how the laminate is curved according to a further embodiment of the manufacturing method of the iron core of a rotating-electric machine in accordance with the present invention.

FIG. 17 is a perspective view illustrating how the laminate is curved according to a further embodiment of the manufacturing method of the iron core of a rotating-electric machine in accordance with the present invention.

In this embodiment, a body curving step is implemented using a slidable forming jig 74 for guiding on both side surfaces of a core proximal portion 15a of a laminate 15. Flanges 74a formed on both edges of the forming jig 74 abut both side surfaces of the core proximal portion 15a with slight clearances therebetween to perform guidance in a slidable state.

According to the manufacturing method for an iron core of a rotating-electric machine described above, the flanges 74a of the forming jig 74 guide the laminate 15 to prevent the laminate 15 from deforming in a direction of lamination. This arrangement allows the possibility of wavy deformation of the laminate 15 to be decreased.

The forming jig in this embodiment can be used for the body curving step in the first to twelfth embodiments.

Fourteenth Embodiment

Figures 18A, 18B, 18C:
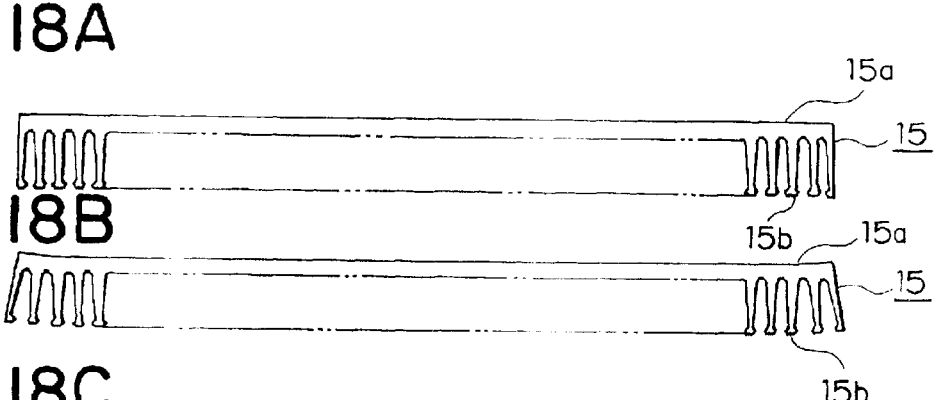
FIG. 18A is a side view of a substantially hexahedral laminate.
FIG. 18B is a side view of the laminate with its both end portions curved.
FIG. 18C is a side view of the laminate with its both end portions joined to form a cylindrical iron core.

FIG. 18 illustrates a manufacturing process of another embodiment of an iron core of a rotating-electric machine in accordance with the present invention. FIG. 18A is a side view of a substantially hexahedral laminate, FIG. 18B is a side view of the laminate with its both end portions curved, and FIG. 18C is a side view of the laminate with its both end portions joined to form a cylindrical iron core.

An iron core of a rotating-electric machine according to this embodiment is an iron core 90 employed with, for example, a rotor of a motor. The iron core 90 is composed of laminated magnetic strips, and has a cylindrical core proximal portion 15a, a plurality of teeth 15b radially projecting outward from the core proximal portion 15a, and slots formed between adjacent teeth 15b to accommodate a winding.

To fabricate a laminate 15, first, a plurality of linear magnetic strips, each having a core proximal portion 15a, and a plurality of teeth 15b are prepared by blanking out as in the case of the prior art, and the magnetic strips are laminated to fabricate the substantially hexahedral laminate 15 as shown in FIG. 18A.

Then, both end portions of the virtually hexahedral laminate 15 are curved at a predetermined curvature so that distal ends of the teeth 15b are radially spread at predetermined intervals as shown in FIG. 18B (an end portion curving step). The predetermined curvature in this case is approximate to a curvature of a finished cylindrical iron core 90 or an iron core after curving the body of the laminate.

Lastly, as illustrated in FIG. 18C, the entire laminate 15 is cylindrically formed by wrapping it around a cylindrical core member (not shown) such that the distal ends of the teeth 15b are oriented to an outer periphery (a body curving step), and a joining portion where both end portions of the laminate 15 abut against each other is welded by laser welding or electron beam welding (a joining step).

In the iron core 90 of a rotating-electric machine constructed as described above, the end portions of the virtually hexahedral laminate 15 are curved in the end portion curving step, then the laminate 15 is formed into a cylindrical shape by wrapping the laminate 15 around a cylindrical core member in the body curving step. This arrangement permits an iron core to have a uniform curvature over its entire circumference with consequent improved roundness of the cylindrical iron core 90. The improved roundness of the iron core 90 makes it possible to reduce a gap relative to a magnetic pole or a magnet disposed, facing against the iron core 90, permitting magnetic resistance in the gap to be reduced. Hence, an output of the rotating-electric machine can be improved.

Fifteenth Embodiment

Figure 19:
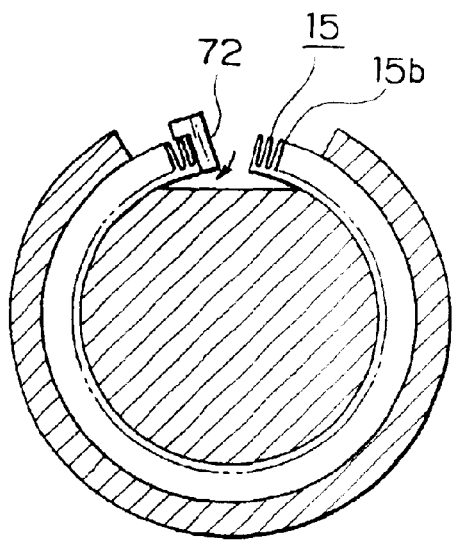
FIG. 19 is a process diagram showing how to curve a laminate according to a further embodiment of the manufacturing method of the iron core of a rotating-electric machine in accordance with the present invention.

FIG. 19 is a process diagram showing how to curve a laminate according to a further embodiment of the manufacturing method of the iron core of a rotating-electric machine in accordance with the present invention.

According to this embodiment, a fabricating method associated with the eleventh embodiment is applied to fabricate the iron core 90 in the fourteenth embodiment. In this embodiment, end portions of a laminate 15 are not curved in a first step. In the embodiment, the entire laminate 15 is curved according to the procedure illustrated in FIG. 13B and FIG. 13C of the tenth embodiment (a body curving step).

Thereafter, as illustrated in FIG. 19, the laminate 15 that has been curved in the foregoing body curving step is clamped at entire inner and outer peripheries thereof except for end portions. Then, a closely contacting jig 72 having an L-shaped section is brought into close contact with a corner of the end of teeth 15b of the laminate 15, and the end of the laminate 15 is curved to wrap toward a core proximal portion 15a by the closely contacting jig 72 (an end portion curving step).

The manufacturing method for an iron core of a rotating-electric machine described above makes it possible to easily provide the iron core with a uniform curvature over the entire circumference thereof, resulting in improved roundness of the cylindrical iron core. The improved roundness of the iron core allows a reduced gap relative to a magnetic pole or a magnet opposing the iron core, and a magnetic resistance in the gap can be reduced, so that a higher output of a rotating-electric machine can be achieved. Furthermore, the laminate is held at inner and outer peripheries thereof other than the end portions when curving the end portions, thus ensuring firm support. Hence, the occurrence of buckle of teeth 15b can be further reduced.

Sixteenth Embodiment

Figure 20:
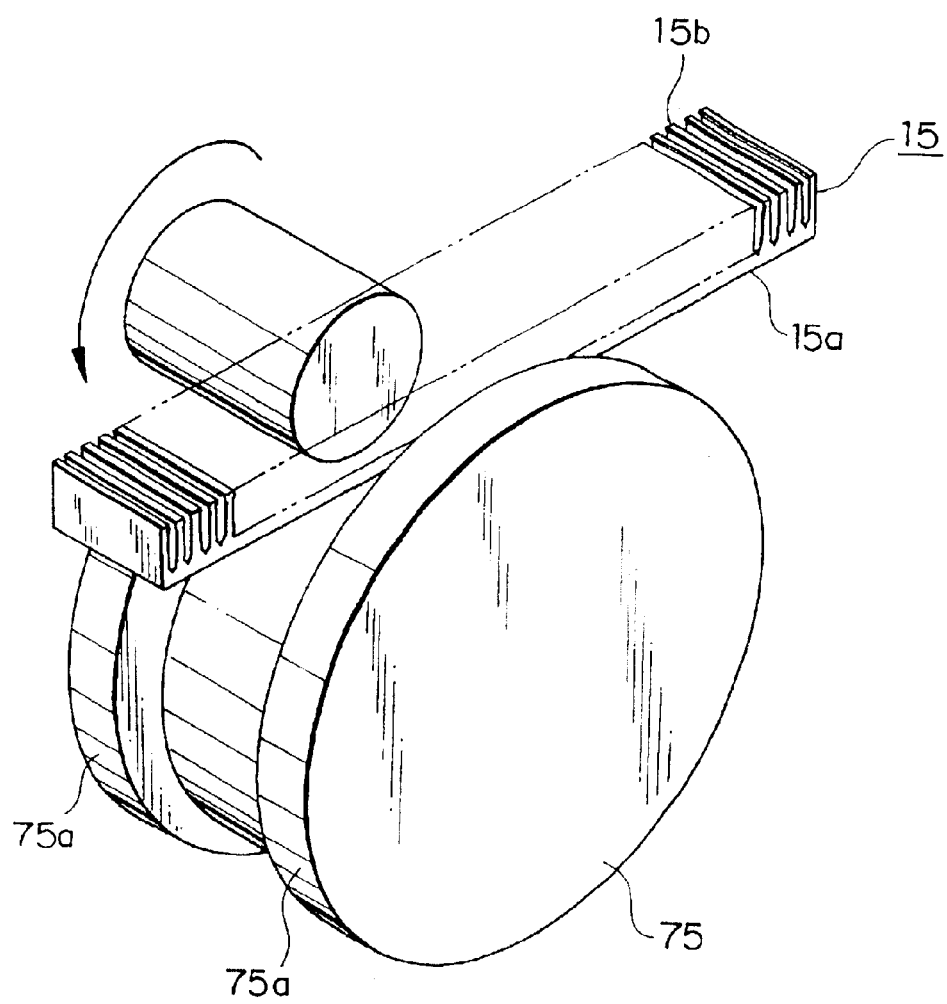
FIG. 20 is a perspective view illustrating how to curve a laminate according to a further embodiment of the manufacturing method of the iron core of a rotating-electric machine in accordance with the present invention.
Figure 21:
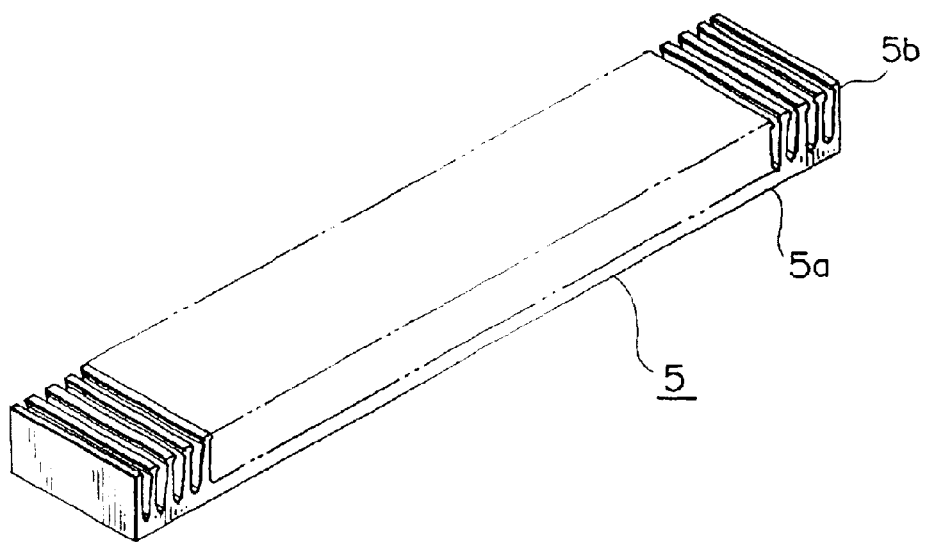
FIG. 21 is a perspective view of a substantially hexahedral laminate constituting a conventional iron core of a rotating-electric machine.
Figure 22:
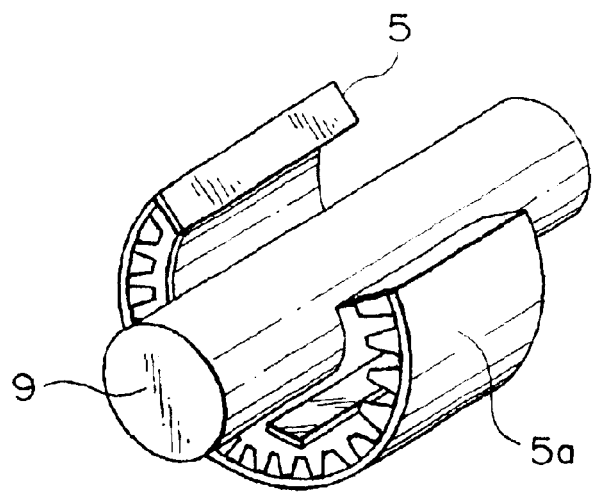
FIG. 22 is a diagram showing an iron core composed of the laminate being formed by wrapping it around a cylindrical core member.
Figure 23:
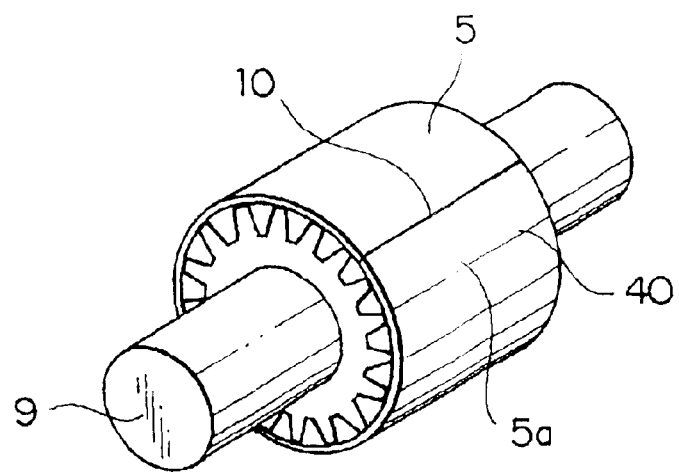
FIG. 23 is a diagram showing both end portions of the cylindrically formed iron core being joined.
Figure 24:
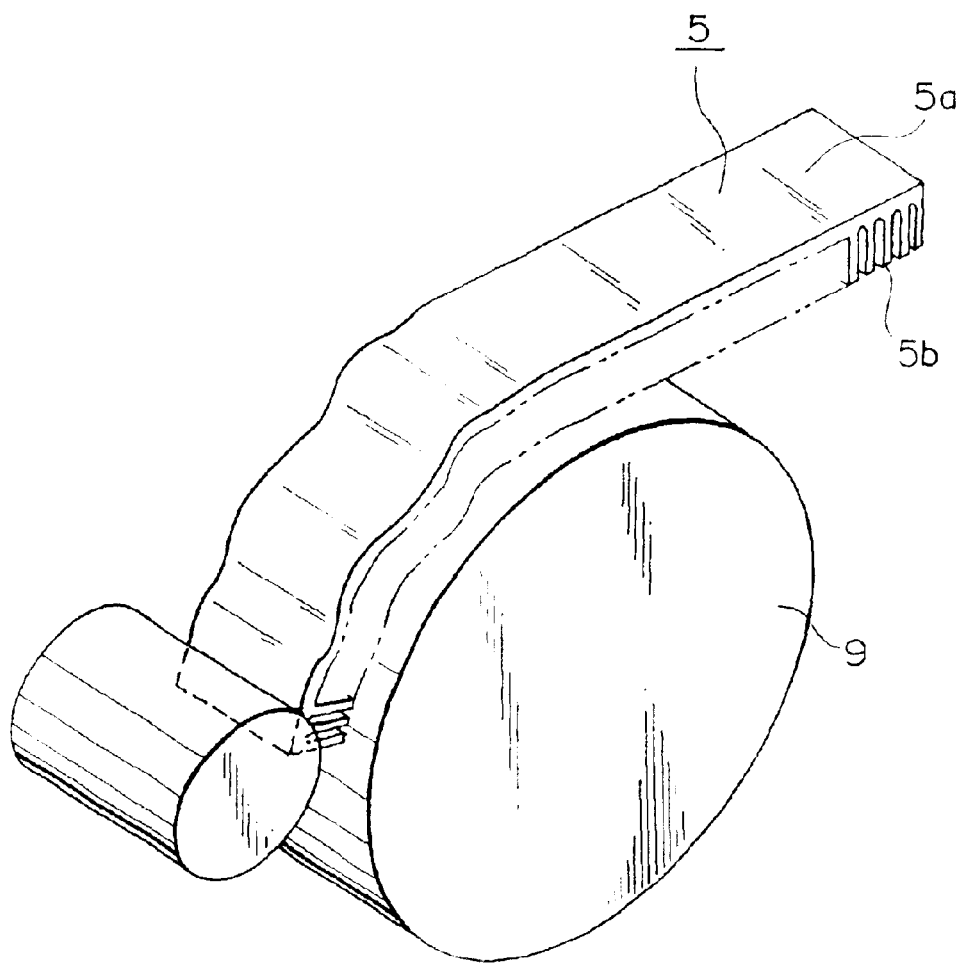
FIG. 24 is a perspective view showing wavy deformation of an iron core observed when a laminate is curved.

FIG. 20 is a perspective view illustrating how to curve a laminate according to a further embodiment of the manufacturing method of the iron core of a rotating-electric machine in accordance with the present invention.

According to this embodiment, a fabricating method associated with the thirteenth embodiment is applied to fabricate the iron core 90 in the fourteenth embodiment.

In this embodiment, a body curving step is implemented using a slidable forming jig 75 for guiding on both side surfaces of a core proximal portion 15a of a laminate 15. Flanges 75a formed on both edges of the forming jig 75 abut both side surfaces of the core proximal portion 15a with slight clearances therebetween to perform guidance in a slidable state.

According to the manufacturing method for an iron core of a rotating-electric machine described above, the flanges 75a of the forming jig 75 guide the laminate 15 to prevent the laminate 15 from deforming in a direction of lamination. This arrangement allows wavy deformation of the laminate 15 to be controlled.

As described above, an iron core of a rotating-electric machine in accordance with the present invention is constructed by laminated magnetic strips, a cylindrical core proximal portion, a plurality of teeth projecting in a substantially radial direction from the core proximal portion, and slots for accommodating a winding that are located between the teeth adjacent to each other, wherein the iron core is fabricated by curving both end portions of a substantially hexahedral laminate so that the core proximal portion obtains a predetermined curvature, forming the entire laminate into a cylindrical shape by wrapping it around a cylindrical core member so that distal ends of the teeth project from the core proximal portion, and joining both end portions of the laminate. Thus, both end portions of the laminate are curved to obtain a final curvature before the entire laminate is formed into a cylindrical shape by wrapping it around the cylindrical core member. This makes it possible to easily provide the iron core with a uniform curvature over the entire circumference thereof, resulting in improved roundness of a cylindrical iron core. The improved roundness of the iron core allows a reduced gap relative to a magnetic pole or a magnet opposing the iron core, and a magnetic resistance in the gap is reduced. Hence, a higher output of the rotating-electric machine can be accomplished.

In the iron core of a rotating-electric machine in accordance with the present invention, both end portions of the core proximal portion of the laminate have a lower rigidity than that of the remainder thereof. With this arrangement, both end portions of the substantially hexahedral laminate can be easily curved, requiring a less force for curving the two end portions, and a uniform curvature of the iron core can be easily accomplished, permitting further improved roundness of the cylindrical iron core.

In the iron core of a rotating-electric machine in accordance with the present invention, both end portions of the core proximal portion of the laminate are provided with portions that are thinner in a radial direction so as to have a lower rigidity. With this arrangement, both end portions of the substantially hexahedral laminate can be easily curved, requiring a less force for curving the two end portions, and a uniform curvature of the iron core can be easily accomplished, permitting further improved roundness of the cylindrical iron core.

In the iron core of a rotating-electric machine in accordance with the present invention, a filling member for filling the thinner portion for making a diameter of a circumferential end of the core proximal end identical to that of the remainder of the iron core is welded to the thinner portion. With this arrangement, both end portions of the substantially hexahedral laminate can be easily curved, requiring a less force for curving the two end portions, and a uniform curvature of the iron core can be easily accomplished, permitting further improved roundness of the cylindrical iron core. Moreover, the core proximal portion has no portion of a smaller radial width since the portion recessed in the radial direction is filled with the filling piece, so that likelihood of the occurrence of magnetic saturation is reduced, leading to higher output of the rotating-electric machine. In addition, welding the filling piece improves the strength of the iron core.

In the iron core of a rotating-electric machine in accordance with the present invention, both end portions of the core proximal portion of the laminate are formed so that the diameter of the circumferential end portions of the core proximal end become smaller toward their ends so as to reduce rigidity. With this arrangement, both end portions of the substantially hexahedral laminate can be easily curved, so that the force required for curving both end portions is reduced, and a uniform curvature of the iron core can be easily achieved, permitting further improved roundness of the cylindrical iron core. Moreover, the simple configuration of both end portions of the iron core permits easy machining of the end portions.

In the iron core of a rotating-electric machine in accordance with the present invention, both end portions of the core proximal portion of the laminate are provided with at least one notch each at the circumferential end portions of the core proximal portion so as to reduce the rigidity thereof. With this arrangement, both end portions of the substantially hexahedral laminate can be easily curved, so that the force required for curving both end portions is reduced, and a uniform curvature of the iron core can be easily achieved, permitting further improved roundness of the cylindrical iron core. Moreover, the simple configuration for reducing the rigidity permits easy machining of the end portions.

The iron core of a rotating-electric machine in accordance with the present invention is formed by curving a single virtually hexahedral laminate. Thus, a single substantially hexahedral laminate is used, so that only one joining step is required. Moreover, since there are fewer joining places, the strength of the iron core can be improved.

The manufacturing method for an iron core of a rotating-electric machine in accordance with the present invention, the iron core including laminated magnetic plate strips, a cylindrical core proximal portion, a plurality of teeth projecting in a substantially radial direction from the proximal portion, and slots located between adjoining teeth to accommodate a winding, includes: an end portion curving step for curving both end portions of a substantially hexahedral laminate of the iron core so that the core proximal portion has a predetermined curvature, a body curving step for curving the entire laminate into a cylindrical shape by wrapping it around a cylindrical core member so that distal ends of the teeth project from the core proximal portion, and a joining step for joining both end portions of the laminate. Hence, both end portions of the laminate are curved to have a final curvature before the entire laminate is wrapped around the cylindrical core member so as to be formed into the cylindrical shape. This makes it possible to easily provide the iron core with a uniform curvature over the entire circumference thereof, resulting in improved roundness of a cylindrical iron core. The improved roundness of the iron core allows a reduced gap relative to a magnetic pole or a magnet opposing the iron core, and a magnetic resistance in the gap is reduced. Hence, a higher output of the rotating-electric machine can be accomplished.

According to the manufacturing method for an iron core of a rotating-electric machine in accordance with the present invention, the laminate is clamped between a first fixing jig disposed at the core proximal portion and a second fixing jig disposed at the teeth such that the end portions project by a predetermined length, and the end portions of the laminate are curved by pressing the end portions in a direction in which the teeth project by a pressing jig in the end portion curving step, an end portion of the second fixing jig that is adjacent to the teeth being provided with an arc or linear slope that becomes farther from the teeth toward an end thereof. Hence, the end portions can be curved simply by pressing them in the direction in which the teeth project, permitting the machining procedure to be simplified. In addition, the slope makes it possible to set the angle, at which the teeth abut the second fixing member, to an appropriate angle, lessening the possibility of buckle of the teeth.

According to the manufacturing method for an iron core of a rotating-electric machine in accordance with the present invention, the laminate is clamped between a first fixing jig disposed at the core proximal portion and a second fixing jig disposed at the teeth such that the end portions project by a predetermined length, and a closely contacting jig having an L-shaped section is placed in close contact with a corner on the core proximal portion of the end of the laminate, and the end portions of the laminate are curved using the closely contacting jig such that they are wrapped toward the teeth, an end portion of the second fixing jig that is adjacent to the teeth being provided with an arc or linear slope that becomes farther from the teeth toward an end thereof. Therefore, the slope makes it possible to set the angle, at which the teeth abut the second fixing member, to an appropriate angle, thus lessening the possibility of buckle of the teeth. Moreover, since the end portion is curved by wrapping, a curving moment can be applied to the portion of the laminate to be curved while reducing the stress applied to the teeth at a position away from the end by a predetermined distance. This makes it possible to further lessen the possibility of buckle of the teeth.

According to the manufacturing method for an iron core of a rotating-electric machine in accordance with the present invention, the iron core is formed by curving a single laminate having a substantially hexahedral shape, and the body curving step includes; a first body curving step in which a central portion of the laminate is clamped, and both end portions of a predetermined length from ends are curved by being wrapped around a cylindrical core member, and a second body curving step in which the curved portions that have been formed in the first step are clamped and the remaining central portion is curved by wrapping it around the core member. Hence, a single substantially hexahedral laminate is used, so that only one joining step is required, and the strength of the iron core can be improved since there are fewer joining places. Moreover, a wide area of the central portion is clamped, so that the end portions can be easily wound onto the core members The manufacturing method for an iron core of a rotating-electric machine in accordance with the present invention, the iron core being constructed by laminated magnetic plate strips, a cylindrical core proximal portion, a plurality of teeth projecting in a substantially radial direction from the core proximal portion, and slots for accommodating a winding that are formed between the teeth adjacent to each other, includes: a body curving step for wrapping a central portion of a laminate around a cylindrical core member to form the laminate into a cylindrical shape such that distal ends of teeth project from the core proximal portion; an end portion curving step for clamping the laminate, which has been curved in the body curving step, at inner and outer peripheries except end portions thereof and curving the end portions of the laminate by pressing or wrapping the end portions toward the inner periphery thereof; and a joining step for joining both end portions of the laminate. This makes it possible to easily provide the iron core with a uniform curvature over the entire circumference thereof, resulting in improved roundness of the cylindrical iron core. The improved roundness of the iron core allows a reduced gap relative to a magnetic pole or a magnet opposing the iron core, and a magnetic resistance in the gap can be reduced, so that a higher output of a rotating-electric machine can be achieved. Furthermore, the laminate is held at inner and outer peripheries thereof other than the end portions when curving the end portions, thus ensuring firm support, permitting the occurrence of buckle of teeth to be further reduced.

The manufacturing method for an iron core of a rotating-electric machine in accordance with the present invention includes a step for accommodating a winding in slots of the substantially hexahedral laminate before at least the body curving step, and the body curving step is implemented with the winding accommodated in the slots. This makes it possible to easily provide the iron core with a uniform curvature over the entire circumference thereof, resulting in improved roundness of the cylindrical iron core. The improved roundness of the iron core allows a reduced gap relative to a magnetic pole or a magnet opposing the iron core, and a magnetic resistance in the gap can be reduced, so that a higher output of a rotating-electric machine can be achieved. Since the winding is accommodated in the substantially hexahedral laminate, the accommodating work is easy. Moreover, sectional areas of the slots decrease after curving; therefore, occupancy of the winding in the slots can be increased with a resultant higher output of the rotating-electric machine.

In the manufacturing method for an iron core of a rotating-electric machine in accordance with the present invention, the body curving step is carried out while at least a part of the core proximal portion of the laminate is slidably guided from both sides. Hence, the laminate is guided so as to prevent the laminate from deforming in a direction of lamination, allowing the possibility of wavy deformation of the laminate to be reduced.

What is claimed is:

1. An iron core of a rotating-electric machine, comprising:
    laminated magnetic plate strips, each of said strips connected to each other to form a substantially hexahedral laminate and, after being formed into said iron core, said substantially hexahedral laminate having a cylindrical core proximal portion;
    a plurality of teeth projecting in a substantially radial direction from the proximal portion; and
    slots for accommodating a winding that are located between the teeth adjacent to each other,
    wherein both end portions of the substantially hexahedral laminate are joined and curved so that the cylindrical core proximal portion obtains a predetermined curvature, the entire substantially hexahedral laminate is formed into a cylindrical shape, and distal ends of the teeth project from the cylindrical core proximal portion, and
    wherein said both end portions of the cylindrical core proximal portion of the laminate are at least one of a size, shape, and dimension that is different from a remainder thereof such that said both end portions have a lower rigidity than that of the remainder thereof.

2. An iron core of a rotating-electric machine according to claim 1, wherein both end portions of the core proximal portion of the laminate are provided with thinner portions that are thinner in a radial direction so as to have a lower rigidity.

3. An iron core of a rotating-electric machine according to claim 2, wherein a filling member for making a diameter of a circumferential end of the core proximal portion identical to that of the remainder is welded to the thinner portions.

4. An iron core of a rotating-electric machine according to claim 1, wherein both end portions of the core proximal portion of the laminate are formed so that the diameters of the circumferential end portions of the core proximal portion become smaller toward ends thereof so as to reduce the rigidities thereof.

5. An iron core of a rotating-electric machine according to claim 1, wherein both end portions of the core proximal portion of the laminate are provided with at least one notch at the circumferential end of the core proximal end so as to reduce the rigidities thereof.

6. The iron core of claim 1, wherein said both end portions are located at a joining portion of said substantially hexahedral laminate.

* * * * *